US012601594B2

(12) United States Patent
Dati et al.

(10) Patent No.: US 12,601,594 B2
(45) Date of Patent: Apr. 14, 2026

(54) OPERATING DEVICE FOR ROTATION-RATE SENSOR HAVING AN ELECTRONIC APPARATUS FOR DETERMINING MECHANICAL AMPLIFICATION OF DEFLECTION OSCILLATORY MOTION AND PHASE SHIFT OF DEFLECTION OSCILLATORY MOTION RELATIVE TO HARMONIC DRIVE OSCILLATION OF SEISMIC MASS

(71) Applicant: Robert Bosch GmbH, Stuttgart (DE)

(72) Inventors: Angelo Dati, Mailand (IT); Joan Josep Giner De Haro, Stuttgart (DE); Mirko Hattass, Stuttgart (DE); Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 279 days.

(21) Appl. No.: 18/484,697

(22) Filed: Oct. 11, 2023

(65) Prior Publication Data

US 2024/0159535 A1 May 16, 2024

(30) Foreign Application Priority Data

Nov. 16, 2022 (DE) ..................... 10 2022 212 209.7

(51) Int. Cl.
*G01C 19/5762* (2012.01)
(52) U.S. Cl.
CPC ................................. *G01C 19/5762* (2013.01)
(58) Field of Classification Search
None
See application file for complete search history.

(56) References Cited

U.S. PATENT DOCUMENTS 6,561,029 B2 * 5/2003 Folkmer ............ G01C 19/5712
73/504.12
7,971,483 B2 * 7/2011 Supino ............... G01C 19/5719
73/504.04

(Continued)

FOREIGN PATENT DOCUMENTS

DE 102004026972 A1 12/2005
DE 102014211646 A1 12/2015

(Continued)

*Primary Examiner* — Peter J Macchiarolo
*Assistant Examiner* — Jermaine L Jenkins
(74) *Attorney, Agent, or Firm* — NORTON ROSE FULBRIGHT US LLP

(57) ABSTRACT

An operating device for a rotation-rate sensor. A mechanical amplification of a deflection oscillatory motion and/or a phase shift of the deflection oscillatory motion relative to a harmonic drive oscillation of a seismic mass can be determined using an electronic apparatus of the operating device by taking into account at least one drive frequency variable with respect to a characteristic drive frequency of the harmonic drive oscillation of the seismic mass of the rotation-rate sensor and by also taking into account at least one detection frequency variable, which is provided by the operating device itself to the operating device, with respect to a characteristic detection frequency of the deflection oscillatory motion, caused by a Coriolis force, of the seismic mass put into the harmonic drive oscillation or with respect to a difference between the characteristic drive frequency and the characteristic detection frequency.

8 Claims, 4 Drawing Sheets

(56)         References Cited

U.S. PATENT DOCUMENTS

| | | | |
|---|---|---|---|
| 9,157,927 B2 * | 10/2015 | Kanemoto ............ | G01P 15/125 |
| 9,453,927 B2 * | 9/2016 | Heitz ................. | G01C 19/5747 |
| 11,099,013 B2 * | 8/2021 | Degenfeld-Schonburg ................ | G01C 19/5712 |
| 11,644,313 B2 * | 5/2023 | Wen ................... | G01C 19/5684 73/504.13 |
| 11,846,509 B2 * | 12/2023 | Reinmuth .......... | G01C 19/5719 |
| 2008/0229822 A1 * | 9/2008 | Kato ................... | G01C 19/574 73/504.12 |
| 2009/0031804 A1 | 2/2009 | Sugibayashi | |
| 2013/0233048 A1 * | 9/2013 | Anac ...................... | G01C 19/56 73/1.77 |
| 2016/0187156 A1 * | 6/2016 | Strobel ............. | G01C 19/5776 73/1.37 |

FOREIGN PATENT DOCUMENTS

| | | | |
|---|---|---|---|
| DE | 102020202158 A1 | 8/2021 | |
| EP | 1759216 B1 * | 2/2010 | ............. G01P 21/00 |

* cited by examiner

OPERATING DEVICE FOR ROTATION-RATE SENSOR HAVING AN ELECTRONIC APPARATUS FOR DETERMINING MECHANICAL AMPLIFICATION OF DEFLECTION OSCILLATORY MOTION AND PHASE SHIFT OF DEFLECTION OSCILLATORY MOTION RELATIVE TO HARMONIC DRIVE OSCILLATION OF SEISMIC MASS

CROSS REFERENCE

The present application claims the benefit under 35 U.S.C. § 119 of German Patent Application No. DE 10 2022 212 209.7 filed on Nov. 16, 2022, which is expressly incorporated herein by reference in its entirety.

FIELD

The present invention relates to an operating device for a rotation-rate sensor and to a rotation-rate sensor. In addition, the present invention relates to a method for operating a rotation-rate sensor.

BACKGROUND INFORMATION

Rotation-rate sensors are described in the related art, such as German Patent Application No. DE 10 2014 211 646 A1. Such a rotation-rate sensor generally has at least one seismic mass, at least one drive electrode which is fastened non-adjustably to and/or in the rotation-rate sensor and at least one detector electrode which is fastened non-adjustably to and/or in the rotation-rate sensor. By means of an AC voltage applied between the at least one seismic mass and the at least one associated drive electrode, the at least one seismic mass can be put into a resonant harmonic drive oscillation. A deflection oscillatory motion, triggered by a Coriolis force, of the at least one seismic mass put into harmonic drive oscillation can be detected by means of the at least one associated detector electrode.

SUMMARY

The present invention provides an operating device for a rotation-rate sensor, a rotation-rate sensor, and a method for operating a rotation-rate sensor.

The present invention provides advantageous possibilities for reliably determining a mechanical amplification of a deflection oscillatory motion, caused by a Coriolis force, of a seismic mass of the rotation-rate sensor, which seismic mass is put into a harmonic drive oscillation, and/or of a phase shift of the deflection oscillatory motion relative to the harmonic drive oscillation of the seismic mass. As will become clear from the following description, the mechanical amplification of the deflection oscillatory motion and/or the phase shift of the deflection oscillatory motion relative to the harmonic drive oscillation can be reliably determined by means of the present invention without an expansion of any hardware of the particular rotation-rate sensor. In particular, when the present invention is used, the usual necessity of forming an additional sensor system on the rotation-rate sensor, which sensor system cannot be used for further operation of the rotation-rate sensor, is eliminated. The present invention thus also enables a miniaturization of the rotation-rate sensor by dispensing with such a sensor system. The present invention thus also contributes to simplifying a design of the rotation-rate sensor using it. Furthermore, as will become clear from the following description, the present invention can be implemented by means of an electronic system which is comparatively inexpensive and requires relatively little installation space.

According to an example embodiment of the present invention, a measurement of a frequency split between the characteristic drive frequency of the harmonic drive oscillation and the characteristic detection frequency of the deflection oscillatory motion caused by the Coriolis force is used in order to determine the mechanical amplification of the deflection oscillatory motion and/or of the phase shift of the deflection oscillatory motion relative to the harmonic drive oscillation. The thus obtained mechanical amplification of the deflection movement and/or the correspondingly determined phase shift of the deflection oscillatory motion relative to the harmonic drive oscillation can be used advantageously not only for a compensation in order to compensate for changes to a transfer function of the particular rotation-rate sensor but also for correcting an amplification or an offset of the rotation-rate sensor. The mechanical amplification of the deflection oscillatory motion of the seismic mass of the particular rotation-rate sensor, which amplification can be reliably determined by means of the present invention, and/or the alternately or additionally determinable phase shift of the deflection oscillatory motion relative to the harmonic drive oscillation of the seismic mass are suitable not only for determining effects of a stress load on the particular rotation-rate sensor but also for readjusting/recalibrating the rotation-rate sensor in order to minimize or eliminate the effects of the stress loads. Such "correctable" stress loads are, for example, mechanical effects on the rotation-rate sensor due to a soldering process, mechanical effects on the rotation-rate sensor due to overmolding with a mold compound, exposure of the rotation-rate sensor to moisture and/or an effect of an external force on the rotation-rate sensor. Such stress loads usually often lead to a change in the mechanical amplification of the deflection oscillatory motion and/or the phase shift of the deflection oscillatory motion relative to the harmonic drive oscillation. As will become clear from the following description, by means of the present invention, however, the particular rotation-rate sensor, in spite of its exposure to stress loads which change the mechanical amplification and/or the phase shift, can then be readjusted/recalibrated in such a way that a reliable operation of the particular rotation-rate sensor remains ensured.

In an advantageous embodiment of the operating device of the present invention, the electronic apparatus is designed and/or programmed such that the mechanical amplification G can be defined, by means of the electronic apparatus by taking into account an angular drive frequency $\omega_a$ of the harmonic drive oscillation as the at least one drive frequency variable and by also taking into account an angular frequency difference $\Delta\omega$ between the angular drive frequency co, and an angular detection frequency $\omega_s$ of the deflection oscillatory motion as the at least one detection frequency variable, according to the equation:

$$G = \frac{K}{\sqrt{\left(1 - \left(\frac{\omega_a}{\omega_a \pm \Delta\omega}\right)^2\right)^2 + \left(\frac{\omega_a}{Q*(\omega_a \pm \Delta\omega)}\right)^2}},$$

wherein the amplification coefficient K and the quality Q are stored in the storage apparatus of the operating device and/or are calculated by the electronic apparatus. By means of the design of the electronic apparatus described here, the mechanical amplification of the deflection oscillatory motion of the seismic mass can be reliably determined.

According to an example embodiment of the present invention, alternatively or additionally, the electronic apparatus can also be designed and/or programmed such that the phase shift $\Phi$ can be determined, by means of the electronic apparatus by taking into account the angular drive frequency $\omega_a$ of the harmonic drive oscillation as the at least one drive frequency variable and by also taking into account the angular detection frequency co s of the deflection oscillatory motion as the at least one detection frequency variable, according to the equation:

$$\arctan(\Phi) = \frac{\frac{\omega_a}{Q * \omega_s} 1}{1 - \left(\frac{\omega_a}{\omega_s}\right)^2},$$

wherein the quality Q is stored in the storage apparatus of the operating device or is calculated by the electronic apparatus. In this way, the phase shift too can be determined by means of an electronic system which is inexpensive and requires little installation space.

In a further example embodiment of the operating device of the present invention, the electronic apparatus is designed and/or programmed such that an offset $\Delta R$ can be determined, by means of the electronic apparatus by taking into account a phase shift deviation $\Delta\Phi$ of the defined phase shift $\Phi$ from a target phase shift $\Phi_0$ stored on the storage apparatus of the operating device, according to the equation: $\Delta R = \Delta\Phi * Q_U$, wherein the quadrature signal $Q_U$ is stored in the storage apparatus of the operating device or is determined by the electronic apparatus during operation of the operating device. Knowledge of the offset is important for its correction.

In a further advantageous embodiment of the operating device of the present invention, the electronic apparatus is designed and/or programmed such that, by means of the electronic apparatus by taking into account the defined mechanical amplification, the defined phase shift and/or the defined offset and by also taking into account a setpoint variable, which is stored in the storage apparatus of the operating device, with respect to a setpoint amplification factor of a signal path of the capacitive sensor, at least one amplification apparatus in the signal path can be set or regulated in such a way that an actual amplification factor of the signal path corresponds to the setpoint variable. In this way, the rotation-rate sensor/its signal path can be recalibrated/readjusted in such a way that a resulting functionality of the rotation-rate sensor is optimized.

According to an example embodiment of the present invention, the advantages described above are also ensured in a rotation-rate sensor comprising such an operating device.

According to an example embodiment of the present invention, the advantages described above are also secured by carrying out a corresponding method for operating a rotation-rate sensor. It is expressly pointed out that the method can be further developed in accordance with the embodiments explained above of the operating device.

In an advantageous embodiment of the method of the present invention, in order to determine the at least one detection frequency variable of the seismic mass that has been put into the harmonic drive oscillation with the characteristic drive frequency, a variable AC voltage with a variable test frequency is applied between the seismic mass and at least one quadrature electrode of the rotation-rate sensor and the test frequency at which the seismic mass is put into a resonant oscillation by means of the variable AC voltage is investigated. This enables a reliable determination of the at least one detection frequency variable.

Alternatively, in order to determine the at least one detection frequency variable of the seismic mass that has been put into the harmonic drive oscillation with the characteristic drive frequency, a short constant voltage signal is applied between the seismic mass and the at least one quadrature electrode of the rotation-rate sensor. In this way too, the at least one detection frequency variable can be reliably determined.

In a further advantageous embodiment of the method of the present invention, by taking into account the defined mechanical amplification and/or the defined phase shift and by also taking into account a predefined setpoint variable with respect to a setpoint amplification factor of a signal path of the capacitive sensor, at least one amplification apparatus in the signal path is set or regulated until an actual amplification factor of the signal path corresponds to the setpoint variable. In this way, a readjustment/recalibration of the rotation-rate sensor/its signal path is possible, by means of which the effects of mechanical stress loads which impair the mechanical amplification and/or the phase shift are minimized/eliminated.

BRIEF DESCRIPTION OF THE DRAWINGS

Further features and advantages of the present invention will be explained in the following with reference to the figures.

DETAILED DESCRIPTION OF EXAMPLE EMBODIMENTS

Figures 1A, 1B:
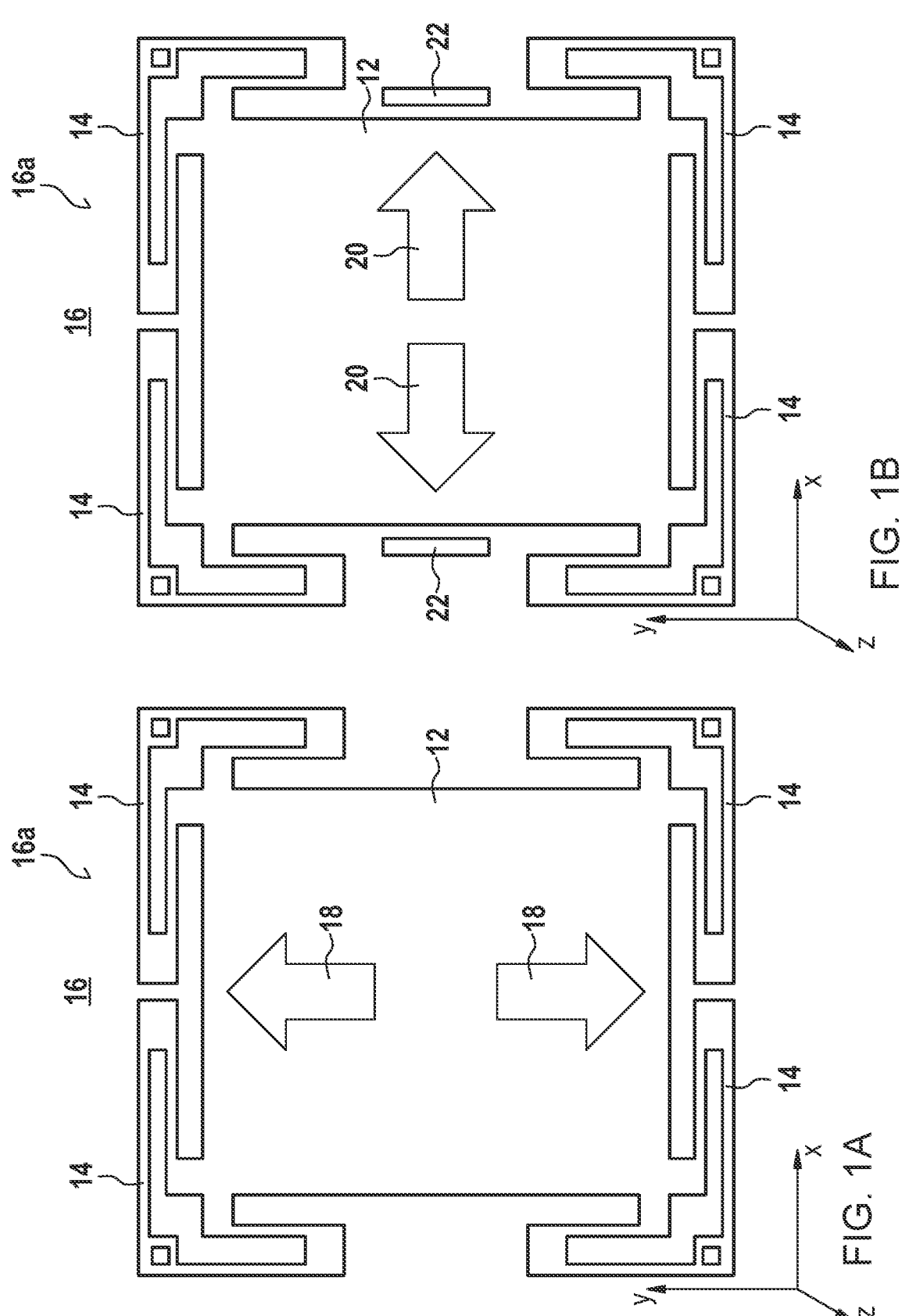
FIGS. 1A to 1C show schematic representations of a rotation-rate sensor in order to explain a mode of operation of an embodiment of the operating device according to the present invention interacting therewith.
Figure 1C:
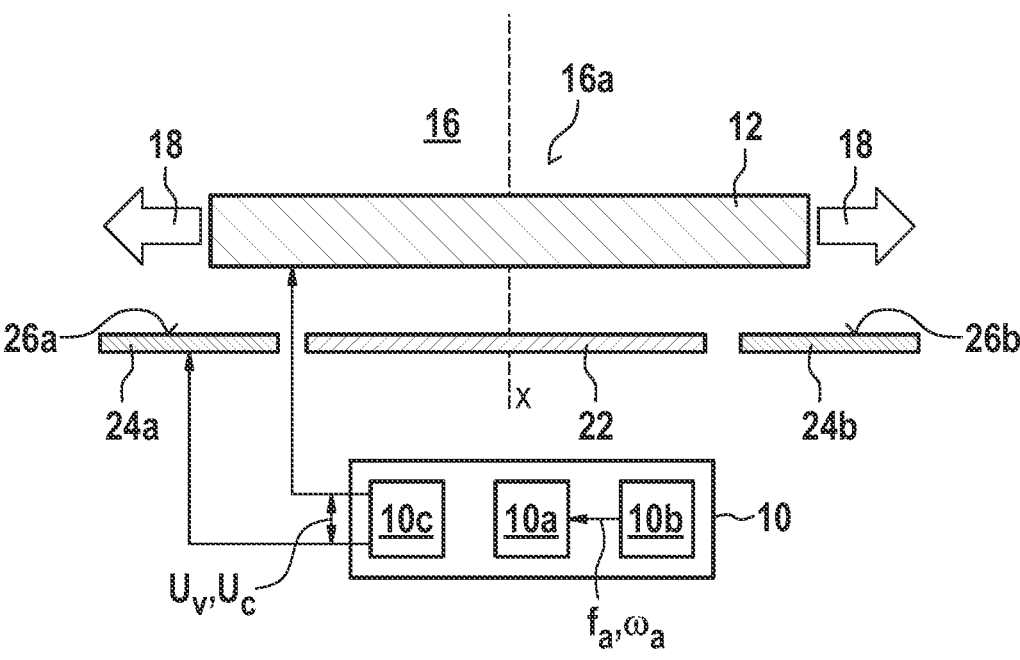

FIGS. 1A to 1C show schematic representations of a rotation-rate sensor in order to explain a mode of operation of an embodiment of the operating device interacting therewith.

The rotation-rate sensor shown schematically in FIGS. 1A to 1C is designed as an "open-loop rotation-rate sensor" for measuring a rotation rate and/or a rotation speed based on a utilization of a Coriolis force. However, it is expressly pointed out that a usability of the operating device 10 described below is not limited to a special sensor type of rotation-rate sensors. Instead, the operating device 10 can interact with (almost) any rotation-rate sensor, which has at least one seismic mass 12, which can be put into a harmonic drive oscillation with a characteristic drive frequency $f_a$ such that a Coriolis force can trigger a deflection oscillatory motion of the seismic mass 12 put into the harmonic drive oscillation. The seismic mass 12 is to be understood as a mass 12 arranged adjustably on and/or in the rotation-rate sensor. The seismic mass 12 is preferably connected via at least one spring 14 to a substrate surface 16a of a substrate 16 in such a way that the seismic mass 12 can be adjusted in relation to the substrate 16 under a deformation of the at least one spring 14. The alignment of the substrate surface 16*a* of the substrate 16 in FIGS. 1A to 1C perpendicular to the z axis should only be regarded as being by way of example.

In the embodiment in FIGS. 1A to 1C, the seismic mass 12 is being/has been put via a drive mechanism (not shown) of the rotation-rate sensor into the harmonic drive oscillation denoted by the arrow 18, in particular into a resonant harmonic drive oscillation (see FIG. 1A). For example, the rotation-rate sensor can have at least one drive electrode which is fastened non-adjustably on and/or in the rotation-rate sensor, wherein a variable voltage signal can be applied between the seismic mass 12 and the at least one associated drive electrode such that the seismic mass 12 can be/is put into the harmonic drive oscillation. Preferably, the harmonic drive oscillation of the seismic mass 12 is parallel to the substrate surface 16*a* of the substrate 16. Only by way of example in FIG. 1A does the (resonant) harmonic drive oscillation of the seismic mass 12 run along the y axis.

As shown in FIG. 1B, a rotation of the rotation-rate sensor with a rotation component unequal to zero perpendicular to the substrate surface 16*a* of the substrate 16 causes an (additional) deflection oscillatory motion of the seismic mass 12 which has been put into the harmonic drive oscillation, which is indicated by arrows 20. In particular, the Coriolis force in this case can trigger a deflection oscillatory motion of the seismic mass 12 that is aligned parallel to the substrate surface 16*a* of the substrate 16 and perpendicular to the harmonic drive oscillation of the seismic mass 12. In the example of FIG. 1B, the deflection oscillatory motion of the seismic mass 12 is therefore aligned along the x axis.

It can be seen from FIGS. 1B and 1C that at least one detector electrode 22 is fastened non-adjustably on and/or in the rotation-rate sensor in such a way that the deflection oscillatory motion of the seismic mass 12 caused by the Coriolis force in the case of the rotation-rate sensor results in a variation of a specific distance of the seismic mass 12 from the at least one detector electrode 22. The at least one detector electrode 22 can therefore be used during verification and/or measurement operation of the rotation-rate sensor for verifying and/or detecting the deflection oscillatory motion of the seismic mass 12.

However, stress loads can lead to mechanical deformation of the rotation-rate sensor during a further processing of the rotation-rate sensor, such as for example when the rotation-rate sensor is being fastened to a contacting electronics system and/or during a packaging of the rotation-rate sensor, and during an operation of the rotation-rate sensor. Stress loads thus usually also have an influence on a sensitivity S of the rotation-rate sensor. However, by means of the embodiment of the operating device 10 described below, it is also possible to ensure an advantageous sensitivity S of the rotation-rate sensor even after stress loads have acted on the rotation-rate sensor.

The operating device 10 can optionally be a subunit of the rotation-rate sensor or be arranged externally to the rotation-rate sensor. The operating device 10 has an electronic apparatus 10*a* which is designed and/or programmed such that a mechanical amplification G of a deflection oscillatory motion and/or a phase shift $\Phi$ of the deflection oscillatory motion relative to a harmonic drive oscillation of a seismic mass 12 can be determined by means of the electronic apparatus 10*a* by taking into account at least one drive frequency variable $f_a$ and $\omega_a$ with respect to the characteristic drive frequency $f_a$ of the harmonic drive oscillation of the seismic mass 12 and by also taking into account at least one detection frequency variable $f_s$, $\omega_s$, $\Delta f$ and $\Delta\omega$ with respect to a characteristic detection frequency $f_s$ of the (addditional) deflection oscillatory motion, caused by a Coriolis force, of the seismic mass 12 (put simultaneously into the harmonic drive oscillation) or with respect to a difference $\Delta f$ and $\Delta\omega$ between the characteristic drive frequency $f_a$ and the characteristic detection frequency $f_s$. With the mechanical amplification G of the deflection oscillatory motion and/or the phase shift $\Phi$ of the deflection oscillatory motion relative to the harmonic drive oscillation, the operating device 10/its electronic apparatus 10*a* can thus determine data the knowledge of which is advantageous for further operation of the rotation-rate sensor. Since the mechanical amplification G and the phase shift $\Phi$ as variables influencing the sensitivity S of the rotation-rate sensor are influenced by stress loads on the rotation-rate sensor, knowledge of these data can in particular also be used to minimize or eliminate the effects of the stress loads on the rotation-rate sensor. Such stress loads, which can be minimized or eliminated by means of the operating device 10, frequently occur, for example, during a soldering process, during overmolding of the rotation-rate sensor with a molding compound, when the rotation-rate sensor is exposed to moisture or when an external force is applied to the rotation-rate sensor. By means of the embodiment of the operating device 10 explained here, however, the conventional disadvantages of such stress loads during a further operation of the rotation-rate sensor need not or scarcely need to be accepted.

The at least one drive frequency variable $f_a$ and $\omega_a$ can be, for example, the characteristic drive frequency $f_a$ and/or an angular drive frequency $\omega_a$ ($\omega_a=2\pi f_a$). The at least one drive frequency variable $f_a$ and $\omega_a$ with respect to the characteristic drive frequency $f_a$ of the harmonic drive oscillation of the seismic mass 12 is usually a fixed variable of the rotation-rate sensor. The at least one drive frequency variable $f_a$ and $\omega_a$ can therefore be saved to/stored in a storage apparatus 10*b* of the operating device 10. Alternatively, the at least one drive frequency variable $f_a$ and $\omega_a$ can also be supplied to the operating device 10, for example by a sensor system (not shown) of the rotation-rate sensor.

The at least one detection frequency variable $f_s$, $\omega_s$, $\Delta f$ and $\Delta\omega$ is, for example, the characteristic detection frequency $f_s$, an angular detection frequency $\omega_s$ ($\omega_s=2\pi f_s$), a characteristic frequency difference $\Delta f$ between the characteristic drive frequency $f_a$ and the characteristic detection frequency $f_s$ and/or an angular frequency difference $\Delta\omega$ between the angular drive frequency $\omega_a$ and the angular detection frequency $\omega_s$. As will become clear from the following description, the at least one detection frequency variable $f_s$, $\omega_s$, $\Delta f$ and $\Delta\omega$ can be determined by the operating device 10/its electronic apparatus 10*a*. Alternatively, the at least one detection frequency variable $f_s$, $\omega_s$, $\Delta f$ and $\Delta\omega$ can also be measured by the sensor system of the rotation-rate sensor and then supplied to the operating device 10/its electronic apparatus 10*a*.

The mechanical amplification G is part of a signal path of the rotation-rate sensor and thus determines a significant part of the sensitivity S of the rotation-rate sensor. The electronic apparatus 10*a* is preferably designed and/or programmed in such a way that by means of the electronic apparatus 10*a* the mechanical amplification G, while the angular drive frequency $\omega_a$ of the harmonic drive oscillation is taken into account as the at least one drive frequency variable $f_a$ and $\omega_a$ and while the angular frequency difference $\Delta\omega$ between the angular drive frequency $\omega_a$ and the angular detection frequency $\omega_s$ is additionally taken into account as the at least one detection frequency variable $f_s$, $\omega_s$, $\Delta f$ and $\Delta\omega$ according to the equation (Eq. 1), can be determined by:

$$G = \frac{K}{\sqrt{\left(1 - \left(\frac{\omega_a}{\omega_a - \Delta\omega}\right)^2\right)^2 + \left(\frac{\omega_a}{Q*(\omega_a + \Delta\omega)}\right)^2}}, \qquad \text{(Eq. 1)}$$

wherein the amplification coefficient K and the quality Q are stored in the storage apparatus 10*b* of the operating device 10*a* and/or are calculated by the electronic apparatus 10*a*. The amplification coefficient K, which is also used to determine the mechanical amplification G, can also be referred to as a static amplification K of the rotation-rate sensor. The amplification coefficient K and the quality Q can, for example, be determined and/or defined during an (initial) calibration of the rotation-rate sensor and then stored in the storage apparatus 10*b* of the operating device 10.

The phase shift $\Phi$ of the deflection oscillatory motion with respect to the harmonic drive oscillation of the seismic mass 12 is relevant for a stability of an offset of the rotation-rate sensor. By means of a knowledge of the phase shift $\Phi$, it can, for example, be prevented that signals not generated by a Coriolis force are added to the rotation-rate signal due to a misalignment of the phase shift $\Phi$. Preferably, the electronic apparatus 10*a* is therefore designed and/or programmed in such a way that the phase shift $\Phi$, while the angular drive frequency $\omega_a$ of the harmonic drive oscillation is taken into account as the at least one drive frequency variable $f_a$ and $\omega_a$ and while the angular detection frequency $\omega_s$ of the deflection oscillatory motion is additionally taken into account as the at least one detection frequency variable $f_s$, $\omega_s$, $\Delta f$ and $\Delta\omega$ according to the equation (Eq. 2), is to be determined by:

$$\arctan(\Phi) = \frac{\omega_a}{Q*\omega_s} \frac{1}{1 - \left(\frac{\omega_a}{\omega_s}\right)^2} \qquad \text{(Eq. 2)}$$

Optionally, (at least) the quality Q is saved to/stored in the storage apparatus 10*b* of the operating device 10. Alternatively, the quality Q can also be calculated by the electronic apparatus 10*a*.

To determine the mechanical amplification G and/or the phase shift $\Phi$ of the deflection oscillatory motion with respect to the harmonic drive oscillation a more complex analytical and/or numerical model can also be stored in the electronic apparatus 10*a*. Alternatively, in the storage apparatus 10*b* of the operating device 10 a different function $\Phi = f(\omega_s, \Phi_0)$ can also be stored, by means of which the phase shift $\Phi$ can be redetermined using the angular detection frequency $\omega_s$ of the deflection oscillatory motion as the at least one detection frequency variable $f_s$, $\omega_s$, $\Delta f$ and $\Delta\omega$ and using a setpoint phase shift $\Phi_0$ prespecified for the rotation-rate sensor. Possibly, at least one further parameter can also be taken into account in the redetermination of the phase shift $\Phi$.

A phase shift deviation $\Delta\Phi$ of the phase shift $\Phi$ from the setpoint phase shift $\Phi_0$ prespecified for the rotation-rate sensor also leads to an erroneous offset $\Delta R$. It is therefore advantageous if, by means of the electronic apparatus 10*a*, the offset $\Delta R$ can also be determined. The offset $\Delta R$, for example, while the phase shift deviation $\Delta\Phi$ of the defined phase shift $\Phi$ from the setpoint phase shift $\Phi_0$ is taken into account, can be determined according to the equation (Eq. 3), by:

$$\Delta R = \Delta\Phi * Q_U \qquad \text{(Eq. 3)}$$

In this case (at least) the target phase shift $\Phi_0$ and/or the quadrature signal $Q_U$ can be saved to/stored in the storage apparatus 10*b* of the operating device 10. Alternatively, the quadrature signal $Q_U$ can be determined by the electronic apparatus 10*a* even during operation of the operating device 10, in particular by the quadrature signal $Q_U$ being measured in parallel/"live".

Furthermore, the sensitivity S of the rotation-rate sensor can also be readjusted by saving to a storage apparatus 10*b* of the operator device 10 a function $S = f(\omega_s, S_0)$, by means of which the sensitivity S can be redetermined using the angular detection frequency $\omega_s$ of the deflection oscillatory motion as the at least one detection frequency variable $f_s$, $\omega_s$, $\Delta f$ and $\Delta\omega$ and using a previously applicable sensitivity $S_0$ of the rotation-rate sensor. At least one further parameter can also be taken into account in the redetermination of the sensitivity S.

As an advantageous development, the operating device 10/its electronic apparatus 10*a* can also be designed/programmed to determine itself a so-called "frequency gap" of the rotation-rate sensor, i.e. the characteristic frequency difference $\Delta f$ between the characteristic drive frequency $f_a$ and the characteristic detection frequency $f_s$ and/or the angular frequency difference $\Delta\omega$ between the angular drive frequency $\omega_a$ and the angular detection frequency $\omega_s$, as an essential system parameter which has an influence on different properties of the rotation-rate sensor. In particular, the operating device 10/its electronic apparatus 10*a* can use here a possible equipping of the rotation-rate sensor with at least one so-called quadrature electrode 24*a* and 24*b*. The at least one quadrature electrode 24*a* and 24*b* is understood to mean an electrode type which is fastened to and/or in the rotation-rate sensor in such a way that an electrode surface 26*a* and 26*b* of the at least one quadrature electrode 24*a* and 24*b* aligned with the seismic mass 12 is aligned parallel to the harmonic drive oscillation, and a surface overlap between the corresponding electrode surface 26*a* or 26*b* and the seismic mass 12 which is put into the harmonic drive oscillation and projected onto the corresponding electrode surface 26*a* or 26*b* in a direction x aligned perpendicular to the harmonic drive oscillation, varies. The at least one quadrature electrode 24*a* and 24*b* is thus typically designed such that a potential difference between each quadrature electrode 24*a* and 24*b* and the seismic mass 12 causes a force, dependent on a current amplitude of the harmonic drive oscillation of the seismic mass 12, between each quadrature electrode 24*a* and 24*b* and the seismic mass 12 in the direction x oriented perpendicular to the harmonic drive oscillation.

As an advantageous development, the operating device 10 can therefore have a voltage application device 10*c*, which is designed and/or programmed in such a way that, while the seismic mass 12 is put into harmonic drive oscillation with the characteristic drive frequency $f_a$, by means of the voltage application device 10*c*, a variable AC voltage $U_v$ can be/is applied between the seismic mass 12 and the at least one quadrature electrode 24*a* and 24*b*. The variable AC voltage $U_v$ is to be understood as meaning a voltage signal having a test frequency $f_t$ varying within a frequency range $[f_{min}, f_{max}]$. The frequency range $[f_{min}, f_{max}]$ preferably corresponds to a range of the characteristic frequency difference $\Delta f$ to be expected. Due to the harmonic drive oscillation of the seismic mass 12 with the characteristic drive frequency $f_a$ the force applied by means of the applied variable AC voltage x between the seismic mass 12 and the at least one quadrature electrode 24a and 24b is modulated. The excitation of the seismic mass 12 effected by means of the variable AC voltage $U_v$ will therefore be resonant when a sum of the characteristic drive frequency $f_a$ and the test frequency $f_t$ is equal to the characteristic detection frequency $f_s$. This applies when the test frequency $f_t$ is equal to the characteristic frequency difference $\Delta f$. Accordingly, an amplitude, that is aligned perpendicular to the harmonic drive oscillation, of the test oscillation motion of the seismic mass 12 that has been triggered by the variable AC voltage $U_v$ also becomes maximal as soon as the test frequency $f_t$ is equal to the characteristic frequency difference $\Delta f$. By measuring the transfer function of the rotation-rate sensor, the characteristic frequency difference $\Delta f$ can therefore be reliably and accurately determined.

Alternatively, the voltage application device 10c can also be designed/programmed to apply, during the harmonic drive oscillation of the seismic mass 12 at the characteristic drive frequency $f_a$, a short constant voltage signal $U_c$ (not equal to zero) between the seismic mass 12 and the at least one quadrature electrode 24a and 24b. Such an "abrupt switching-on" of the short voltage signal $U_c$ between the seismic mass 12 and the at least one quadrature electrode 24a and 24b causes an additional test oscillation movement of the seismic mass 12 in the direction x aligned perpendicular to the harmonic drive oscillation. A portion of modes with the characteristic detection frequency $f_s$ decay at the test oscillation movement of the seismic mass 12, until the seismic mass 12 oscillates perpendicular to harmonic drive oscillation only at the characteristic drive frequency $f_a$. The changing amplitude of the test oscillation movement can be detected by means of a measurement signal tapped off between the seismic mass 12 and the at least one quadrature electrode 24a and 24_b_. Due to the demodulation of the measurement signal at the characteristic drive frequency $f_a$, the characteristic frequency difference $\Delta f$ between the characteristic drive frequency $f_a$ and the characteristic detection frequency $f_s$ can be seen at the beginning of the test oscillatory movement. To determine the characteristic frequency difference $\Delta f$ on the basis of the measurement signal, a numerical fit can be performed for example, or the zero crossings of the measurement signal can be examined.

As a further advantageous development, the electronic apparatus 10a can also be designed and/or programmed, while the defined mechanical amplification, the defined phase shift, and/or the defined offset $\Delta R$ are taken into account and while a setpoint variable $\Omega$ stored in the memory device 10b of the operator device 10 with respect to a setpoint amplification factor of a signal path (not shown) of the capacitive sensor is additionally taken into account, to set or regulate at least one amplification apparatus in the signal path in such a way that an actual amplification factor of the signal path corresponds to the setpoint variable $\Omega$. The signal path can also be understood to mean an amplification path of the capacitive sensor and/or a data path of the capacitive sensor. For example, multiplying by a digital amplification factor causes an ACTUAL sensitivity of the capacitive sensor to correspond to a reference or target sensitivity specified as setpoint variable $\Omega$. This realizes a calibration/recalibration of the rotation-rate sensor, as a result of which, for example, its digital amplification can be recalibrated in such a way that fluctuations in a transfer function of the rotation-rate sensor, such as in particular by component-specific deviations in its quality Q and/or in the position of its characteristic detection frequencies $f_s$, can be compensated. Even a phase position or an offset adjustment can be readjusted/recalibrated in this way. In this way, stress influences on the characteristic detection frequency $f_s$ can in particular be minimized/compensated. In addition, from the measurement of the characteristic frequency difference $\Delta f$ further settings, such as filter settings in particular, in the signal path of the rotation-rate sensor can be adjusted/optimized.

The advantageous design of the operating device 10 described in the preceding paragraph thus also enables a readjustment/recalibration of the rotation-rate sensor. Effects of mechanical stress loads on the rotation-rate sensor can be "corrected out" in this way. Even in the case of a deformation of the rotation-rate sensor, for example of its MEMS structure and/or its packaging, the operating device 10 can also optimize its functioning with regard to a desired mode of operation by means of the advantageous readjustment/recalibration of the rotation-rate sensor.

FIGS. 2A to 2E show a flowchart and coordinate systems in order to explain an embodiment of the method for operating a rotation-rate sensor.

The method described here can, for example, be carried out by means of the rotation-rate sensor explained above. However, a practicability of the method is not limited to any special type of rotation-rate sensor.

in a method step S1, while at least one seismic mass of the rotation-rate sensor is put into a harmonic drive oscillation with a characteristic drive frequency of the harmonic drive oscillation, at least one detection frequency variable is determined. In a method step S0 carried out before method step S1, the seismic mass of the rotation-rate sensor is possibly put into the harmonic drive oscillation with the characteristic drive frequency. A possibility for carrying out the method step S0 has already been discussed above.

As has already been explained above, the at least one detection frequency variable is in each case to be understood as a variable with respect to a characteristic detection frequency of a deflection oscillatory motion, caused by a Coriolis force, of the seismic mass or with respect to a difference between the characteristic drive frequency and the characteristic detection frequency. Examples of the at least one detection frequency variable have already been enumerated above.

In order to determine the at least one detection frequency variable of the seismic mass that has been put into the harmonic drive oscillation with the characteristic drive frequency, a variable AC voltage with a varying test frequency can be applied, for example, between the seismic mass and at least one quadrature electrode of the rotation-rate sensor. At the same time, it is possible to investigate at which test frequency the seismic mass is put into a resonant oscillation by means of the variable AC voltage. As already explained above, an amplitude, oriented perpendicular to the harmonic drive oscillation, of a test oscillation movement of the seismic mass triggered by means of the variable AC voltage is then at maximum when the test frequency is equal to a characteristic frequency difference between the characteristic drive frequency and the characteristic detection frequency.

Alternatively, to determine the at least one detection frequency variable of the seismic mass that has been put into the harmonic drive oscillation with the characteristic drive frequency, a short constant voltage signal can also be applied between the seismic mass and the at least one quadrature electrode of the rotation-rate sensor. This excites the seismic mass for an additional test oscillation movement into a direction oriented perpendicular to the harmonic drive oscillation, wherein a portion of modes with the characteristic detection frequency at the test oscillation movement of the seismic mass decays relatively quickly. However, the characteristic frequency difference between the characteristic drive frequency and the characteristic detection frequency can be determined by demodulation of a measurement signal tapped off between the seismic mass and the at least one quadrature electrode at the characteristic drive frequency at the start of the test oscillation movement.

In a method step S2, a mechanical amplification G of the deflection oscillatory motion and/or a phase shift $\Phi$ of the deflection oscillatory motion relative to the harmonic drive oscillation of the seismic mass is then determined. The mechanical amplification G and/or the phase shift $\Phi$ is determined while at least one drive frequency variable with respect to the characteristic drive frequency of the harmonic drive oscillation is taken into account and while the detection frequency variable (determined in the method step S1) is additionally taken into account. Examples of the at least one detection frequency variable have also already been enumerated above. The mechanical amplification G and/or the phase shift $\Phi$ can be determined in particular using the equations given above (Eq. 1) and (Eq. 2).

Figure 2A:
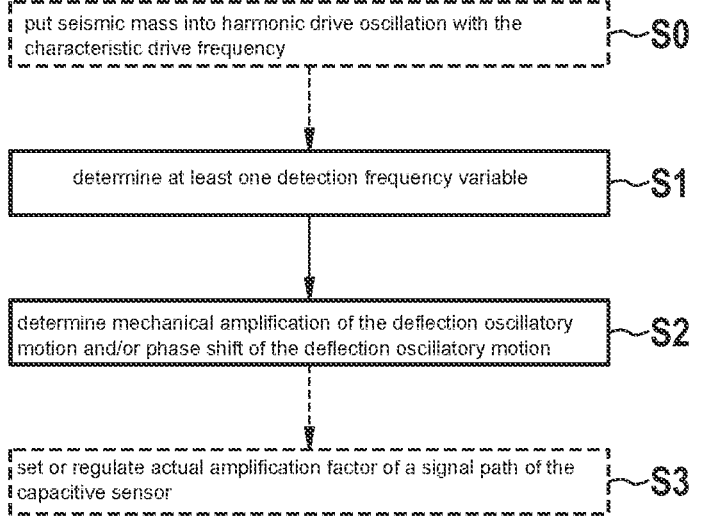
FIGS. 2A to 2E show a flowchart and coordinate systems in order to explain an example embodiment of the method for operating a rotation-rate sensor, according to the present invention.
Figure 2B:
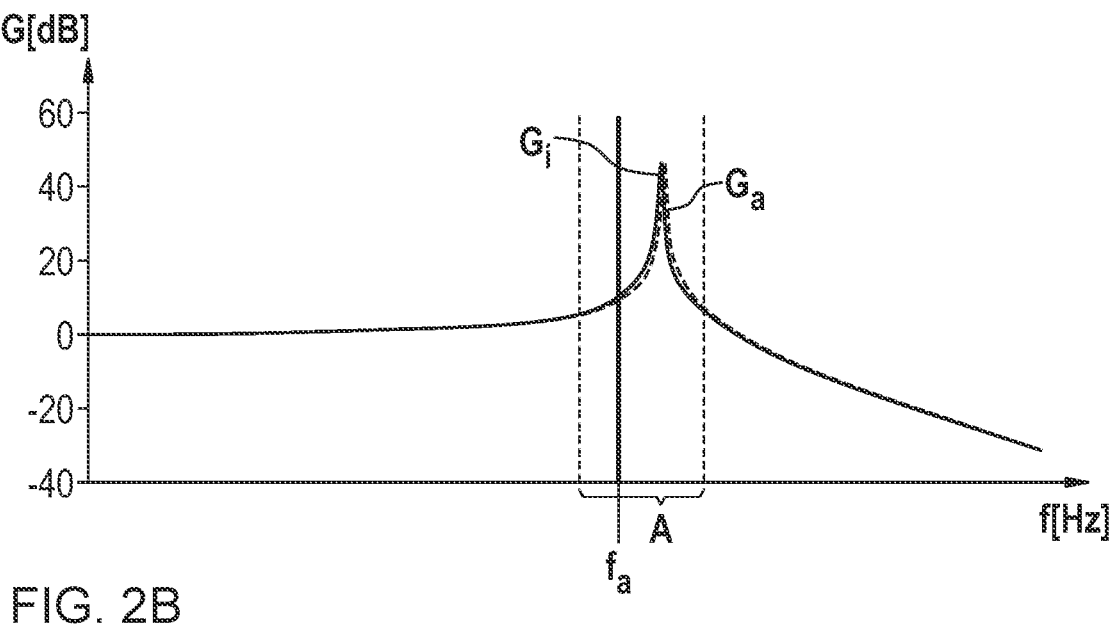
Figure 2C:
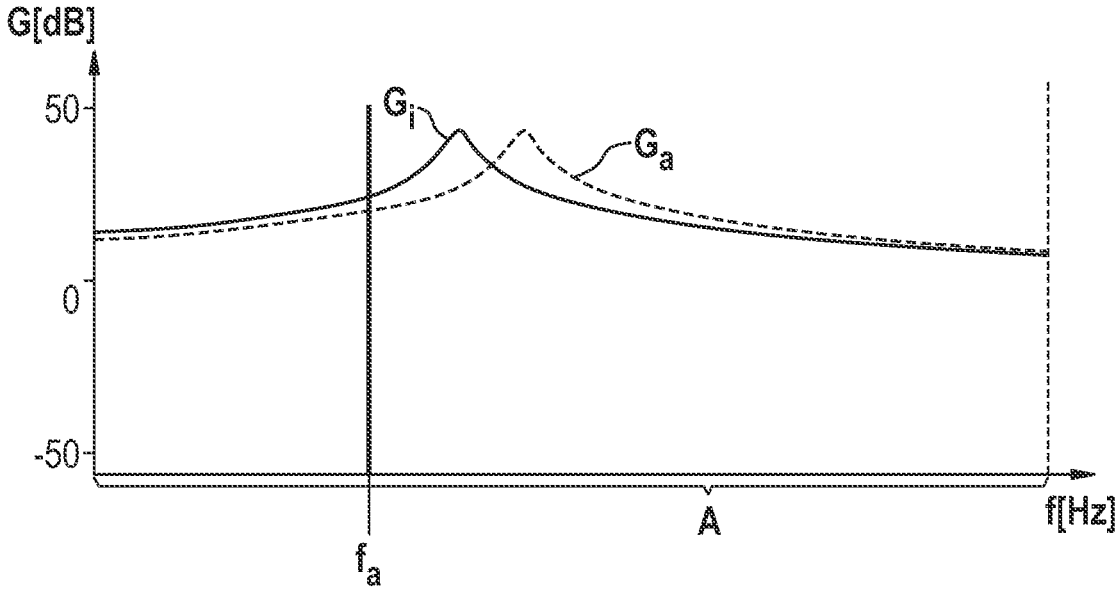

In the coordinate systems in FIGS. 2B and 2C, the abscissa shows frequencies f (in Hz), while the mechanical amplification G (in decibel/dB) is reproduced by means of the ordinates. It can be seen that a mechanical amplification $G_i$ present before additional loads deviates from the mechanical amplification $G_a$ present after the additional loads, wherein the coordinate system in FIG. 2C shows an enlarged detail A of the coordinate system in FIG. 2B.

Figure 2D:
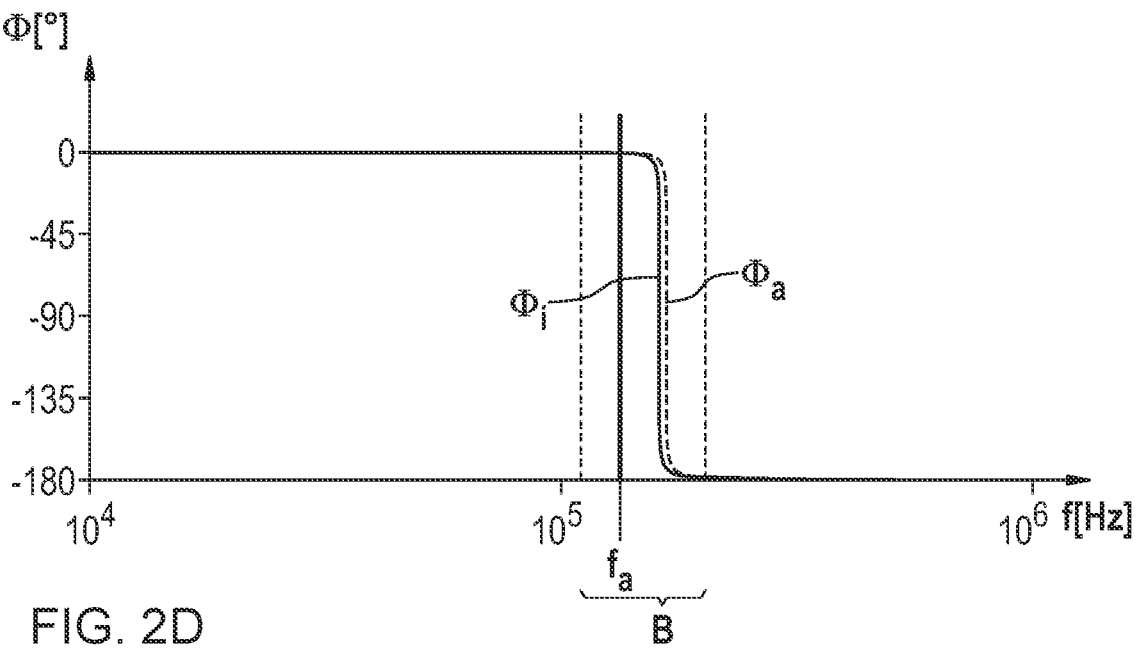
Figure 2E:
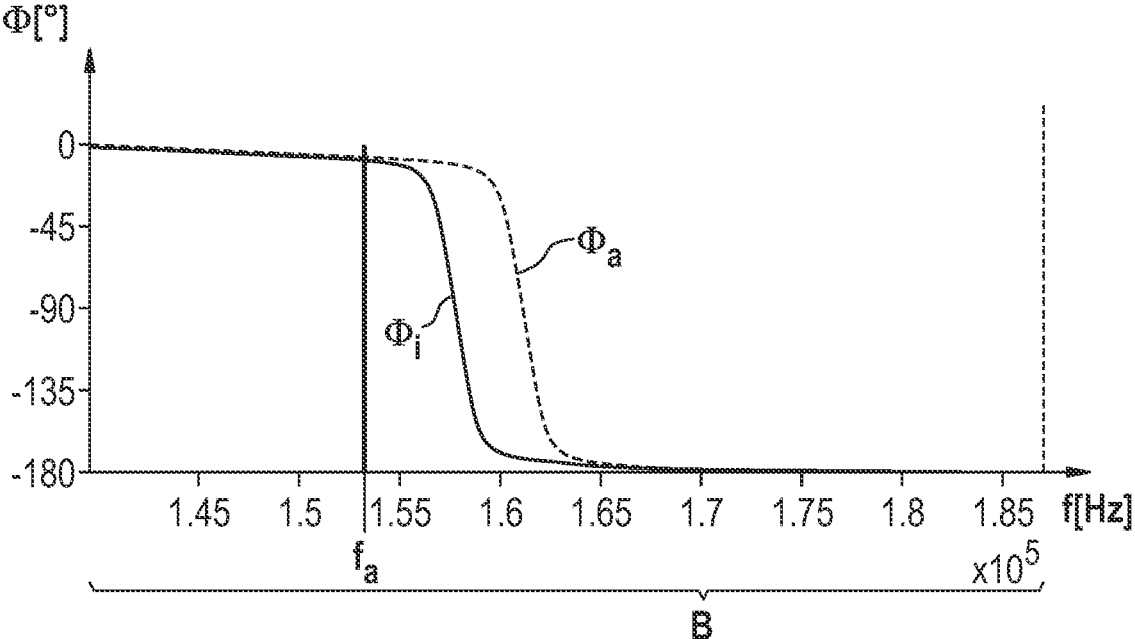

The abscissae of the coordinate systems in FIGS. 2D and 2E show frequencies f (in Hz), but the phase shift $\Phi$ (in °/degrees) is presented by means of the ordinates of the coordinate systems in FIGS. 2D and 2E. The coordinate system in FIG. 2E shows an enlarged detail B of the coordinate system in FIG. 2D. Plotted into the coordinate systems in FIGS. 2D and 2E are the phase shift $\Phi_i$ present before additional loads and the phase shift $\Phi_a$ present after the additional loads.

The deviations of the mechanical amplification $G_i$ present before the additional loads from the mechanical amplification $G_a$ present after the additional loads and the phase shift $\Phi_i$ present before the additional loads from the phase shift $\Phi_a$ present after the additional loads can be reliably determined by carrying out at least the method steps S1 and S2.

Optionally, a method step S3 can then also be carried out. As method step S3, an actual amplification factor of a signal path of the capacitive sensor can be set or regulated in accordance with a prespecified setpoint variable with respect to a (desired) setpoint amplification factor of the signal path. For this purpose, while the defined mechanical amplification G and/or the defined phase shift $\Phi$ is taken into account and the prespecified target variable $\Omega$ is additionally taken into account, at least one amplification apparatus in the signal path is set or regulated until an actual amplification factor of the signal path corresponds to the setpoint variable. This effects an "adaptation" of the signal path in such a way that an actual amplification factor of a supplied signal corresponds to the desired setpoint amplification factor. Method step S3 enables a readjustment/recalibration of the rotation-rate sensor such that effects of mechanical stress loads on the rotation-rate sensor can be minimized or eliminated.

What is claimed is:

1. An operating device for a rotation-rate sensor, comprising:

an electronic apparatus which is configured to determine a mechanical amplification of a deflection oscillatory motion and/or a phase shift of the deflection oscillatory motion relative to a harmonic drive oscillation of a seismic mass by taking into account at least one drive frequency variable, which is stored on a storage apparatus of the operating device or provided to the electronic apparatus, with respect to a characteristic drive frequency of the harmonic drive oscillation of the seismic mass of the rotation-rate sensor and by also taking into account at least one detection frequency variable which is provided by the operating device itself to the operating device, with respect to a characteristic detection frequency of the deflection oscillatory motion, caused by a Coriolis force, of the seismic mass put into the harmonic drive oscillation or with respect to a difference between the characteristic drive frequency and the characteristic detection frequency, wherein the electronic apparatus is configured to determine the mechanical amplification G by taking into account an angular drive frequency $\omega_a$ of the harmonic drive oscillation as the at least one drive frequency variable and by also taking into account an angular frequency difference $\Delta\omega$ between the angular drive frequency $\omega_a$ and an angular detection frequency $\omega_s$ of the deflection oscillatory motion as the at least one detection frequency variable, according to the following equation:

$$G = \frac{K}{\sqrt{\left(1 - \left(\frac{\omega_a}{\omega_a \pm \Delta\omega}\right)^2\right)^2 + \left(\frac{\omega_a}{Q*(\omega_a \pm \Delta\omega)}\right)^2}},$$

wherein an amplification coefficient K and a quality Q are stored in the storage apparatus of the operating device and/or are calculated by the electronic apparatus.

2. The operating device according to claim 1, wherein the electronic apparatus is configured to determine the phase shift $\Phi$, by taking into account an angular drive frequency $\omega_a$ of the harmonic drive oscillation as the at least one drive frequency variable and by also taking into account an angular detection frequency $\omega_s$ of the deflection oscillatory motion as the at least one detection frequency variable, according to the following equation:

$$\arctan(\Phi) = \frac{\frac{\omega_a}{Q * \omega_s} 1}{1 - \left(\frac{\omega_a}{\omega_s}\right)^2},$$

wherein the quality Q is stored in the storage apparatus of the operating device or is calculated by the electronic apparatus.

3. The operating device according to claim 2, wherein the electronic apparatus is configured to determine an offset $\Delta R$ by taking into account a phase shift deviation $\Delta\Phi$ of the determined phase shift from a target phase shift stored on the storage apparatus of the operating device, according to the following equation:

$$\Delta R = \Delta\Phi * Q_U,$$

wherein a quadrature signal $Q_U$ is stored in the storage apparatus of the operating device or is determined by the electronic apparatus during operation of the operating device.

4. The operating device according to claim 3, wherein the electronic apparatus is configures to, by taking into account the determined mechanical amplification and/or the determined phase shift and/or the determined offset and by also taking into account a setpoint variable, which is stored in the storage apparatus of the operating device, with respect to a setpoint amplification factor of a signal path of a capacitive sensor, set or regulate at least one amplification apparatus in the signal path in such a way that an actual amplification factor of the signal path corresponds to the setpoint variable.

5. A rotation-rate sensor, comprising:

an operating device including an electronic apparatus which is configured to determine a mechanical amplification of a deflection oscillatory motion and/or a phase shift of the deflection oscillatory motion relative to a harmonic drive oscillation of a seismic mass by taking into account at least one drive frequency variable, which is stored on a storage apparatus of the operating device or provided to the electronic apparatus, with respect to a characteristic drive frequency of the harmonic drive oscillation of the seismic mass of the rotation-rate sensor and by also taking into account at least one detection frequency variable which is provided by the operating device itself to the operating device, with respect to a characteristic detection frequency of the deflection oscillatory motion, caused by a Coriolis force, of the seismic mass put into the harmonic drive oscillation or with respect to a difference between the characteristic drive frequency and the characteristic detection frequency, wherein the electronic apparatus is configured to determine the mechanical amplification G by taking into account an angular drive frequency $\omega_a$ of the harmonic drive oscillation as the at least one drive frequency variable and by also taking into account an angular frequency difference $\Delta\omega$ between the angular drive frequency $\omega_a$ and an angular detection frequency $\omega_s$ of the deflection oscillatory motion as the at least one detection frequency variable, according to the following equation:

$$G = \frac{K}{\sqrt{\left(1 - \left(\frac{\omega_a}{\omega_a \pm \Delta\omega}\right)^2\right)^2 + \left(\frac{\omega_a}{Q * (\omega_a \pm \Delta\omega)}\right)^2}},$$

wherein an amplification coefficient K and a quality Q are stored in the storage apparatus of the operating device and/or are calculated by the electronic apparatus.

6. A method for operating a rotation-rate sensor, comprising:

determining, while a seismic mass of the rotation-rate sensor is put into a harmonic drive oscillation with a characteristic drive frequency of the harmonic drive oscillation, at least one detection frequency variable with respect to a characteristic detection frequency of a deflection oscillatory motion, caused by a Coriolis force, of the seismic mass or with respect to a difference between the characteristic drive frequency and the characteristic detection frequency; and determining a mechanical amplification of the deflection oscillatory motion and/or of a phase shift of the deflection oscillatory motion with respect to the harmonic drive oscillation of the seismic mass by taking into account at least one drive frequency variable with respect to the characteristic drive frequency of the harmonic drive oscillation and by also taking into account the at least one determined detection frequency variable, wherein, by taking into account the determined mechanical amplification and/or a determined phase shift, and by also taking into account a prespecified target variable with respect to a setpoint amplification factor of a signal path of a capacitive sensor, at least one amplification apparatus in the signal path is set or regulated until an actual amplification factor of the signal path corresponds to the setpoint variable.

7. The method according to claim 6, wherein, to determine the at least one detection frequency variable of the seismic mass that has been put into the harmonic drive oscillation with the characteristic drive frequency, a variable AC voltage with a variable test frequency is applied between the seismic mass and at least one quadrature electrode of the rotation-rate sensor and a test frequency at which the seismic mass is put into resonant vibration using a variable AC voltage is investigated.

8. The method according to claim 6, wherein, to determine the at least one detection frequency variable of the seismic mass that has been put into the harmonic drive oscillation with the characteristic drive frequency, a short constant voltage signal is applied between the seismic mass and at least one quadrature electrode of the rotation-rate sensor.

\* \* \* \* \*